United States Patent [19]

Novak

[11] Patent Number: 4,945,628
[45] Date of Patent: Aug. 7, 1990

[54] TOOL STORE FOR MACHINE TOOLS

[75] Inventor: Peter Novak, Tagerwilen, Switzerland

[73] Assignee: Starrfraschmachinen, AG, Rorschacherberg, Switzerland

[21] Appl. No.: 397,019

[22] Filed: Aug. 22, 1989

[30] Foreign Application Priority Data

Aug. 24, 1988 [CH] Switzerland ............. 3151/88

[51] Int. Cl.⁵ ............................................. B23Q 3/157
[52] U.S. Cl. ........................................ 29/568; 211/1.5
[58] Field of Search ................ 29/568, 26 A; 211/1.5

[56] References Cited

U.S. PATENT DOCUMENTS

| 3,443,309 | 5/1969 | Huller et al. | 29/568 |
| 3,545,075 | 12/1970 | Ollearo | 29/568 |
| 4,783,902 | 11/1988 | Novak | 29/568 |

Primary Examiner—Z. R. Bilinsky
Attorney, Agent, or Firm—Helfgott & Karas

[57] ABSTRACT

A tool store device comprises a stnad having a base and a support frame on which is supported a tool carrier. The tool carrier is constructed as a semi-spherical shell which is rotatable about a horizontal axis and carries tools which are densely arranged thereon with their longitudinal axes extending at right angles to the store surface. On the inside of the tool carrier there is positioned an advance unit having a displacement unit and a gripper which are rotatably mounted in the support frame about a vertical axis passing through the center (M) of the imaginary ball of which the semi-spherical shell of the tool carrier is the part. The advance unit cooperates with a tool changer, which has a swivel arm swivellable about the horizontal axis. A tool double gripper is fixed to the arm. The advance unit can advance a tool at a random point of the tool carrier to a transfer station, where it can be taken over by the double tool gripper. The swivel arm brings the double gripper at the transfer station into the vicinity of a work spindle of a machine tool, where the tool is inserted into the spindle from the tool double gripper. The tool is taken back from the work spindle in the reverse order by the tool gripper, which transfers the tool to the advance unit at the transfer station of the tool store device.

25 Claims, 7 Drawing Sheets

TOOL STORE FOR MACHINE TOOLS

BACKGROUND OF THE INVENTION

The present invention relates to a tool store device for machine tools, particularly for programmable machine tools for storing, removing, returning and making available tools, in which the tools are arranged singly and/or in groups with their longitudinal axes extending at right angles to the store surface, and wherein tools are gripped by an advance unit and can be taken over at a transfer station from a tool handling device and/or returned by the same.

Tool store devices are used in various machine tools, particularly for the numerically controlled machining of workpieces, e.g. in machining centers. An important problem in such a process is to make available sufficient tools at such a distance, which would not be too great to transfer the tools to the machine tool and then return them subsequently back.

The applicant's European patent 266,646 discloses a tool storage for machine tools and a method for operating the same, in which a rotor is mounted in a rotary manner on a column. The rotor carries two tracks on which are displaceably mounted tool magazines containing tools. In order to make available a single tool or a number of tools, in the case of multiple spindle machines, the tool magazine with the desired tool is coupled to the rotor and moved to a loading and unloading station, where the tool magazine is uncoupled from the rotor, taken over by a gripper station and fixed, so that by using a tool handling device the desired tool can be removed and transferred to the machine tool. By the use of the tool storage, the locations for the individual tools can be very closely juxtaposed, but a magazine-free sector remains unoccupied. Although this storage can be advantageously used both for a single spindle and multiple spindle machine tools, it is mainly directed at use on multiple spindle machine tools.

In a further tool storage of the present applicant according to CH 3941/87, the tools are densely and uninterruptedly arranged over the entire circumference of a cylinder rotor, so that there is no direct access possibility for a tool changer. If the tools are housed in tool magazines on the rotor, then the desired tool magazine on the rotor is moved to a feed unit, which takes over the particular tool magazine and advances it over the length of the tools of the adjacent tool magazines. The desired tool can now be gripped with a tool changer and brought to the intended place of use. If only individual tools are to be removed from the magazine, then a tool advance unit in the form of a displacement arm mounted in the interior of the cylindrical rotor and having a tool gripper is provided. This advance unit grips the desired tool and moves it radially over the length of the adjacent tools, so that it can be taken over by the tool changer. As a result of the uninterrupted arrangement of the tools, the storage capacity of this tool store is increased as compared with the first-mentioned tool storage. Each tool can be advanced by the advance unit arranged in the interior of the cylindrical rotor, because apart from its rotary movement, the rotor can also perform a vertical lifting movement. As the advance unit can in each case only advance one tool, this construction is more suitable for single spindle machine tools than the construction with the feed unit permitting the advance of a complete tool magazine.

Even though in these known tool storages the access time for replacing a tool in the tool spindle is relatively short, it is not possible to overlook the fact that it is not possible to reduce the distance between the tool store and the spindle below a certain limit.

SUMMARY OF THE INVENTION

It is an object of the present invention to provide an improved tool storage of the foregoing type in which, whilst maintaining a large storage capacity, there will be a further reduction in the access time for changing a tool on the tool spindle.

According to the invention, this and other objects are attained by a tool store device in which a tool carrier is mounted on a column in the form of a spherical segmental shell and is provided with tool locations and which is driven by a motor mounted in the column and is rotatable about a horizontal axis intersecting the center of the spherical segmental shell, and wherein an advance unit is arranged in the interior of the spherical segmental shell.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENTS

Figure 1:
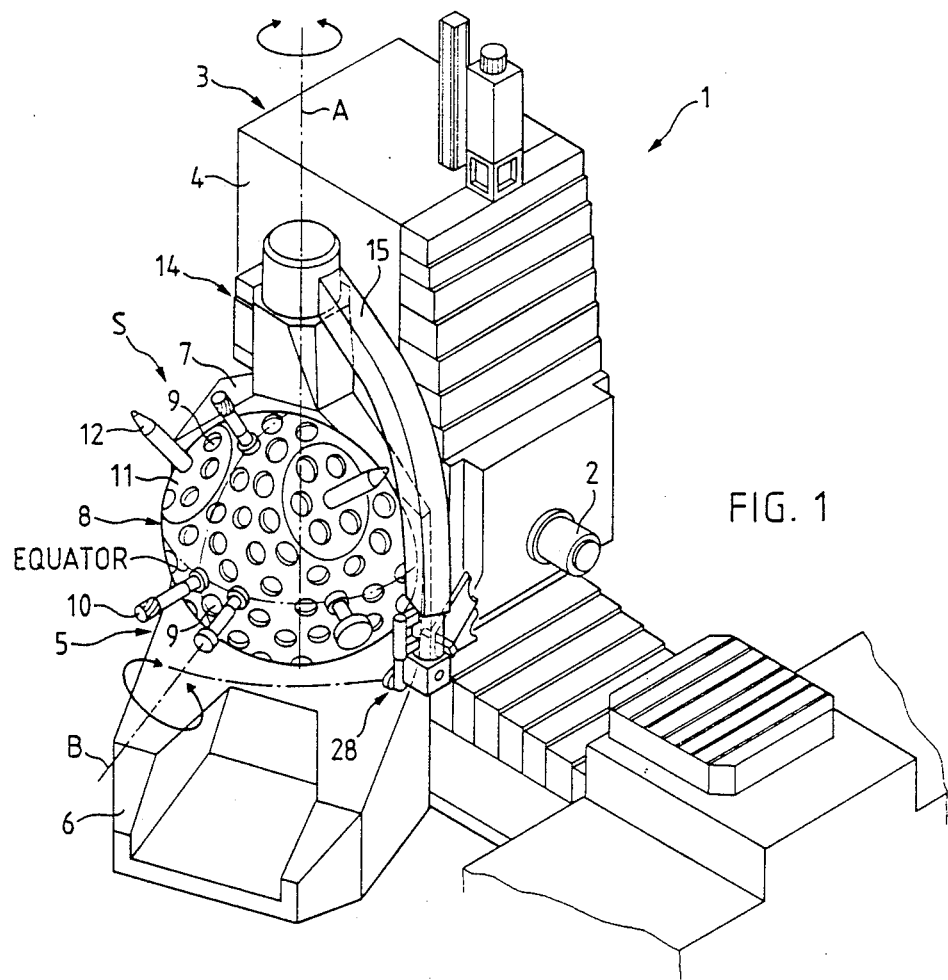
FIG. 1 is a perspective view of a machine tool with a horizontally mounted work spindle and a tool store device.

The machine tool, e.g. a horizontal milling and drilling machine shown in FIG. 1 has a horizontally mounted work spindle 2, which is mounted in a vertically adjustable manner in a machine column 3. On the side wall 4 of machine column 3, is provided a tool store device S which includes a stand 5, a base 6 and a support frame 7. On the latter is rotatably mounted a tool carrier 8, which has a spherical segmental construction and on the surface of which are compactly arranged tool-receiving locations or openings 9, in which can be inserted tools 10 with their holders. Alongside the individual tool locations 9, tool magazines 11 can be also fixed on tool carrier 8. Several tool locations 9 are combined at the tool magazine 11 into a unit. Each tool magazine 11 carries a reception mandrel 12 for the handling thereof.

A tool changer 14 is rotatable with its swivel arm 15 on support frame 7 about a vertical axis A, whilst the tool carrier 8 is rotatable about a horizontal axis B. Both axes A and B intersect at the center M (FIG. 2) of the substantially semi-spherical shell of the tool carrier. Movements of the tool changer 14 and advance unit 25 about vertical axis A and tool carrier 8 about horizontal axis B can be performed in a random successive manner, but also simultaneously.

Figure 2:
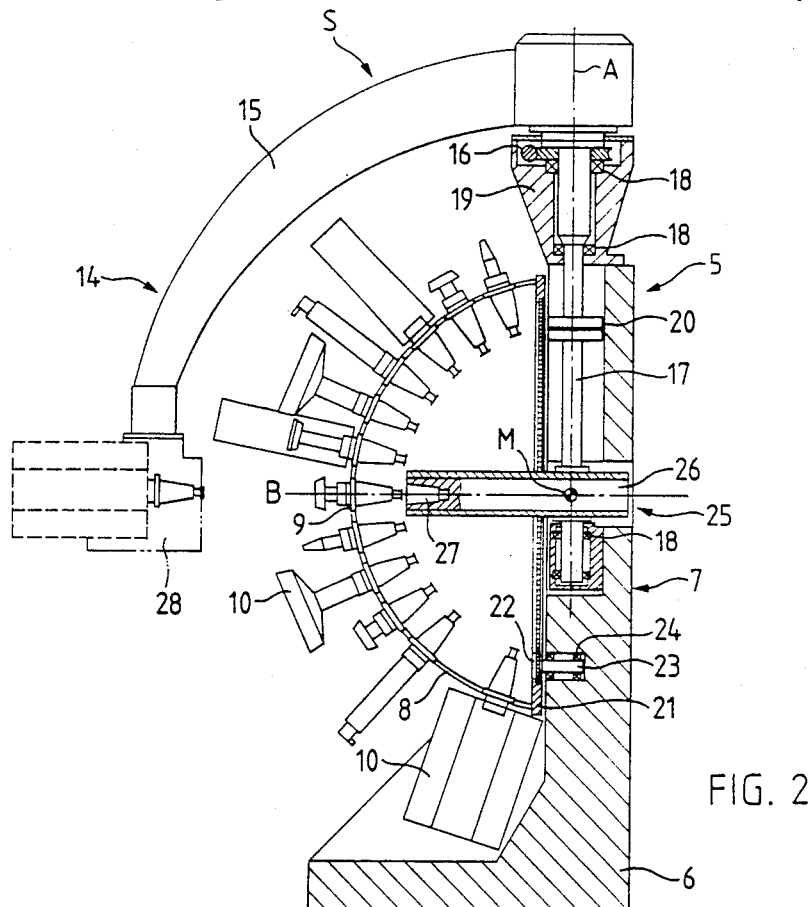
FIG. 2 is a vertical section through the tool store device arranged on the side of the machine tool of FIG. 1.

FIG. 2 is a detailed view of the store device S. Swivel arm 15 is fixed to a vertical swivel shaft 17, which is mounted in bearings 18 positioned in support frame 7 and in a stand head 19 mounted on support frame 7. The lower part of swivel shaft 17 can be separated from the upper part by a clutch 20. The vertical axis A of swivel shaft 17 intersects the center M of a ball, the spherical segmental part of which forms the tool carrier 8 formed as a substantially semi-spherical cup. On the support frame side, tool carrier 8 is bounded by a bearing and drive ring 21, which is constructed as an internal or external toothed rim and which is rotatably mounted on pinions 22 mounted in support frame 7. Pinions 22 are mounted on a shaft 23 in bearings 24. A further pinion is in a drive connection with a non-shown drive housed in support frame 7 for rotating tool carrier 8 about horizontal axis B. Mounting can also take place in some other way, e.g. in that the tool carrier 8 is mounted on the support frame side on a single, circumferentially arranged antifriction bearing.

On the inside of the shell-shaped tool carrier 8, is incorporated an advance unit 25, which is supported in the swivel shaft 17. The advance unit 25 comprises a displacement unit 26, e.g. a linear motor, and a gripper 27. The gripper 27 can be secured to the taper from behind a tool 10 inserted in tool carrier 8 and can advance the same by displacement unit 25 to such an extent that it can be taken over by a tool chamber 28 which is a double gripper fixed in the swivel arm 15, as will be explained hereinafter. Gripper 27 is described in detail in the second-mentioned industrial property right, so that a further description will not be given.

Through the simultaneous movement of swivel arm 15 about axis A and tool carrier 8 about horizontal axis B by the necessary angle, any desired tool can be positioned in a very short time upstream of advance unit 25. The advance unit 25 grips the tool 10 from the rear, releases the tool locking means and moves the tool linearly into the transfer position. The tool is then gripped by the tool changer 28 and directly thereafter inserted in work spindle 2. All the components necessary for advancing and changing a tool in spindle 2 are fitted and matched with one another on the fixed stand 5, so that it is possible to obtain a precisely pre-assembled and adjusted, independent tool supply unit with tool store device S and tool changer 14.

The tools 10 are inserted and locked in their tool openings or locations 9 on the shell-like tool carrier 8, so that they cannot drop out even in the case of rapid rotary movements of the tool carrier 8. Tool carrier 8 can be constructed as a sheet metal, spherical segmental shell produced by pressing, in which the tool locations 9 are subsequently cut and provided with tool-matching inserts. The shell can also be cast from light metal and the tool locations 9 made therein.

Figure 3:
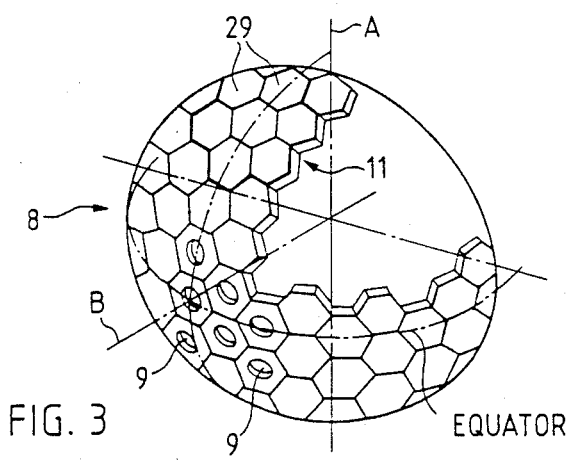
FIG. 3 illustrates a perspective view of an embodiment of the store tool carrier according to FIG. 2.

FIG. 3 shows another way for producing the tool carrier 8. The shell is assembled from individual glass fiber-reinforced plastic parts 29 having a hexagonal shape to form a self-supporting structure. From individual parts of this type it is possible to form a tool magazine 11, cf. FIGS. 1 and 3. Such interchangeable tool magazines arranged on the circumference of the tool carrier 8 serve to rapidly load the tools to and unload the tools from the tool store device. The assembly of the shell of tool carrier 8 from individual parts represents a very economic solution. The manufacture of the shell as a one-piece component from an appropriate plastics material would only be economic if such shells can be manufactured in large numbers.

Figures 4, 4A:
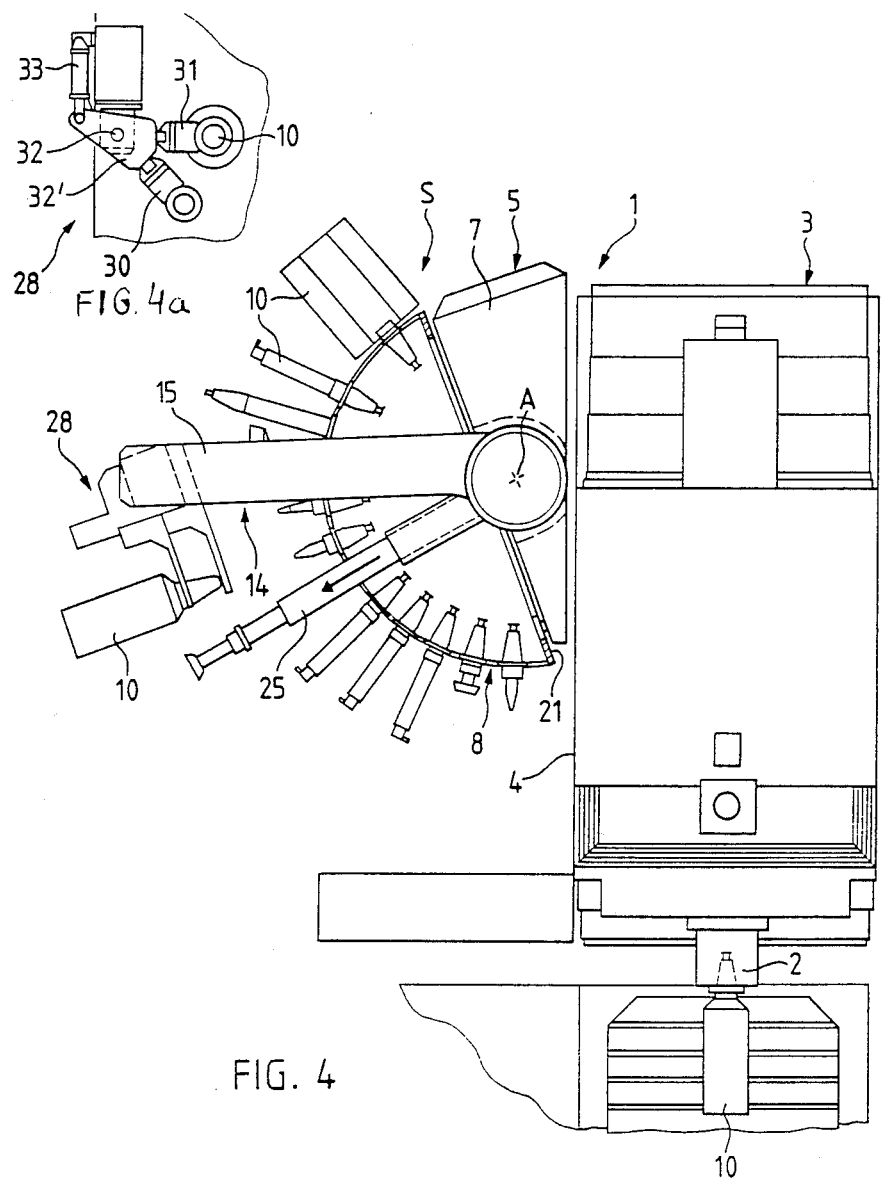
FIG. 4 is a plan view of the machine tool and the tool store device according to FIG. 1.
FIG. 4a is a detail of FIG. 4, on enlarged scale.

FIG. 4 shows the machine tool 1 and tool store device S in a plan view. Stand 5 has a wedge-shaped cross-section, so that the horizontal axis B is inclined with respect to the axis of machine spindle 2, whereby the swivel path of swivel arm 15 is reduced. If the cross-section of stand 5 was rectangular, then axis B would form a right angle with the axis of spindle 2, so that the path of the tool double gripper 28 would be greater by this additional angular amount, but also by the width of support frame 7.

FIG. 4 shows the tool double gripper 28 in a plan view whereas FIG. 4 shows the tool changer or double gripper 28 in a side view, and in detail. The double gripper 28 comprises two swivel grippers 30, 31, which can be swivelled about a horizontal axle 32 by a linear motor 33 to two positions. In addition, the swivel grippers 30, 31 are displaceable by a linear motor 34, e.g. a lifting cylinder, into a forward and a back position as will be explained in connection with FIGS. 5 and 6. These swivelling and displacement movements can be easily gathered from FIGS. 5 and 6, which show the tool double gripper 28 on a larger scale. A swivel plate 32' is rotatably mounted on shaft or axle 32. The linear motor 33 supported on swivel arm 15 acts on the swivel plate 32'. Two longitudinal guides 36 are fixed to the swivel plate 32' and the two swivel grippers 30, 31 are longitudinally displaceably guided thereon. To each swivel gripper 30, 31 is fixed a driver pin 35 which, in position I, projects into the vicinity of a slide plate 37 of the second linear motor 34. Only in position I, i.e. in the acceptance and transfer position I, can each gripper 30, 31 be advanced. On swivelling of the gripper 31 by means of linear motor 33 about horizontal axle or shaft 32 into the broken line position II, gripper 30 moves out of position III in FIG. 5 into position I, so that each swivel gripper 30, 31 can be moved into the acceptance and transfer position I. In FIG. 6, the swivel gripper 31 is in position I, i.e. in the acceptance and transfer position. Linear motor 34 can move back the swivel gripper 31 into the broken line position. FIG. 6 also shows tool 10 in broken line.

Figure 5:
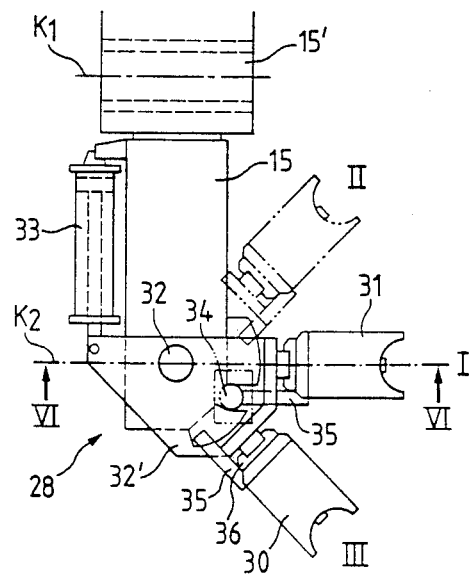
FIG. 5 is a schematic side view of a tool double gripper of a tool changer arranged on the tool carrier of the tool store device according to FIG. 4.
Figure 6:
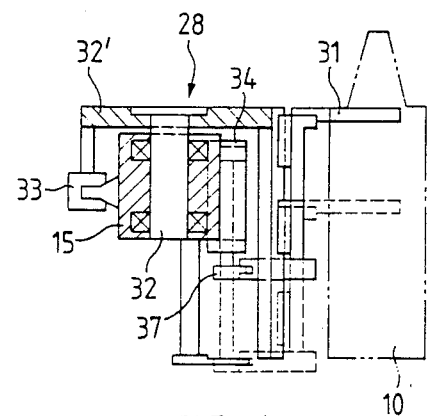
FIG. 6 is a sectional view through the tool double gripper taken along line VI—VI of FIG. 5.

In FIG. 5 an axis $K_1$ is shown in broken line in swivel arm 15 and a diagrammatically represented joint with a swivel pin 15' is located in arm 15, whereby the lower part of swivel arm 15 can be swivelled by 90° about axis $K_1$. This simple addition ensures that the tool store device S can be used in the same way for machine tools with a vertical tool spindle. In the case of the vertical spindle, tool store device S will remain in an unchanged position and will not be subject to further modifications. For reasons of completeness, it is pointed out that the swivel axis for the 90° swivelling of the lower part of swivel arm 15 is also located at a different point, e.g. on an axis $K_2$ in the vicinity of swivel shaft 32 of swivel grippers 30, 31.

Tool changing into or out of the machine spindle 2 can be explained in respect to FIG. 4. The swivel arm 15 of the tool changer 14 waits with the desired tool, which is located in one of the swivel grippers 30, 31, in a waiting position in the vicinity of machine spindle 2. If the machine spindle 2 is oriented in the change position, the swivel arm 15 swivels into said position. The movements of swivel arm 15 and swivel grippers 30, 31 are necessarily coordinated in such a way that the empty tool gripper can pass linearly into the tool carrier 8 located in spindle 2. The used tool carrier 8 is drawn out of the machine spindle by means of the lifting movement of linear motor 34. For this purpose the swivel grippers 30, 31 ar each displaceably mounted on the longitudinal guide 36 and provided with the driver pin 35 on which engages the slide plate 37 of linear motor 34 in position I.

After extracting the used tool, the swivel grippers swivel by 45°, in order to position the new tool in front of spindle 2. As a result of the travel of linear motor 34 the new tool is inserted in spindle 2. By rotation about axis A, the swivel arm 15 is drawn back into the store area. Swivel arm 15 moves into the new position desired by the control system in order to remove a new tool from store device S or in order to deposit the used tool. Due to the short distances and simple movements, the described tool change sequence is very fast.

A new requested tool has already been brought by the rotary movement of tool carrier 8 about the B axis onto the "equator" (in the plane of position I of the tool double gripper 28). This can be carried out during the tool exchange on spindle 2. The advance unit 25 grips the tapered part or shank of the tool positioned in front of it from the rear, releases the tool locking means and advances the tool linearly. If the tool is to be deposited, the advance unit is advanced to an empty storage location and deposited, the advance unit is advanced to an empty storage location and is ready at this point to take over the tool and then deposit it in the store device.

Figure 7B:
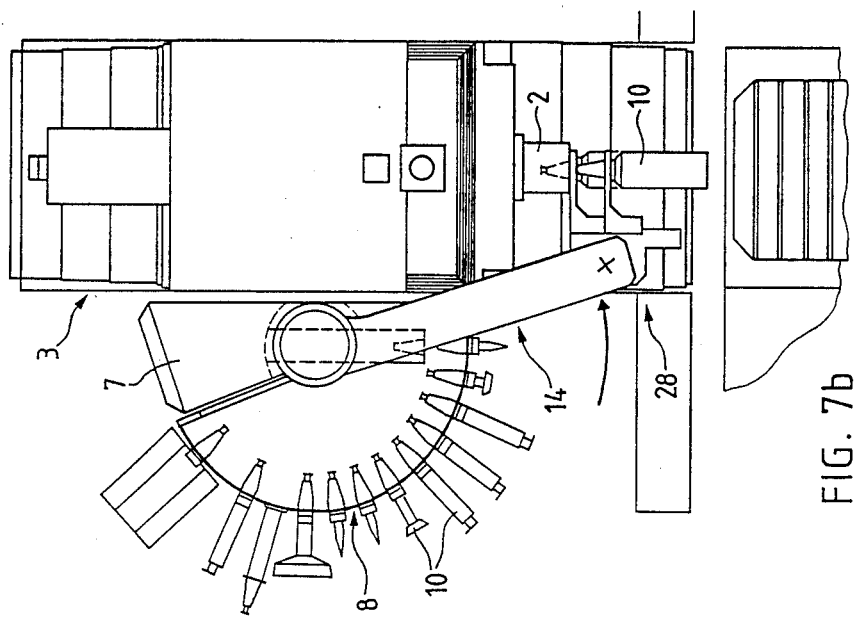
FIG. 7b is a same plan view similar to that of the tool store in FIG. 7a, but illustrating the tool changer located in the tool change position on the machine tool.
Figure 7A:
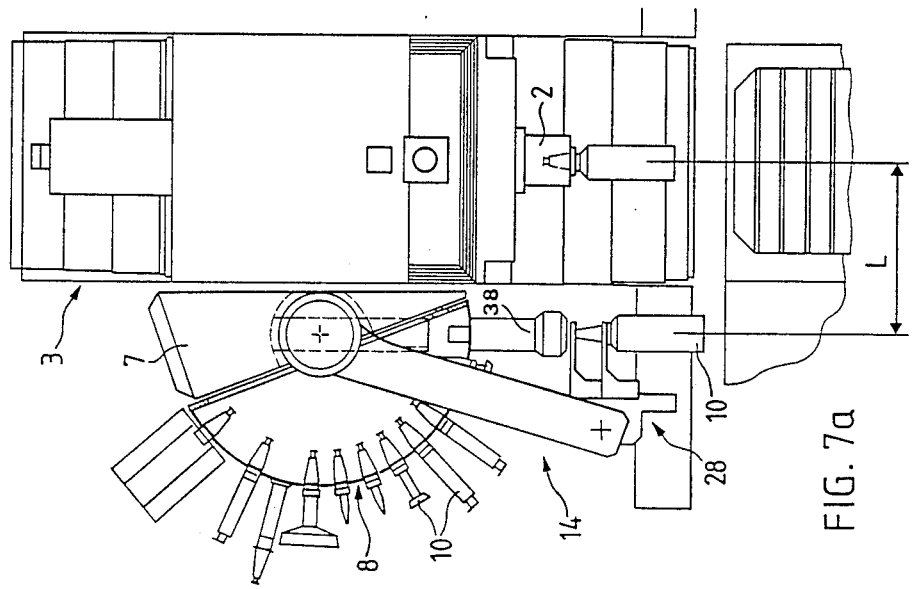
FIG. 7a is a plan view of the tool store device according to FIG. 4 with a tool taper cleaning station arranged in the tool carrier, with the tool changer assuming its waiting position.

The tool change into and out of the tool magazine takes place in a similar way. The tools deposited on the tool carrier 8 have a clearly defined position. As a result of the spherical surface and as a result of the rotation of the tool carrier 8, each tool reaches the "equator" semicircle, which is the geometrical position, where the tools can be removed or transferred for tool change purposes. It is possible to remove each tool within the "equator" quadrant closer to spindle 2. It is advantageous for this purpose that approximately 80 to 90% of all the tools in the store device be housed on the first three to four largest paths of the semi-spherical cap of the tool carrier. Therefore the most frequent change frequencies are concentrated on less than one quadrant. This explains the very short times required for making the tool available with tool changer 14, which leads to correspondingly short cycle times. FIGS. 7a and 7b illustrate this advantage clearly. In FIG. 7a, the tool changer 14 is in its waiting position with the tool 10 to be inserted in work spindle 2. Distance L indicates the spacing of tool 10 in the waiting position from the tool inserted in work spindle 2. This spacing is only a little more than half the machine width. FIG. 7b shows the position of the tool changer 14 on inserting the new tool 10 in the work spindle 2.

By means of the advance unit 25, the desired tool 10 is advanced to the tool double gripper 28 and gripped on the flange part by one of the swivel grippers 30, 31. Optionally, the swivel grippers must firstly perform a 45°-rotation movement. As a result of the movement of linear motor 34, tool 10 is drawn out of the gripper 27 of advance unit 25. Before the new tool 10 can be brought into the machine spindle, the used tool must be deposited. This takes place by swivelling the swivel grippers 30, 31 about the horizontal shaft 32, whereupon the linear motor 34 moves the tool into the gripper 27 of advance unit 25, where it is fixed. The swivel arm 15 now swivels back by a small angle and frees the space in order to draw in the used tool. Swivel arm 15 moves with the new tool into the waiting position, the position of the swivel grippers 30, 31 for gripping the tool out of the spindle already being prepared. The actual tool change in the spindle 2 now takes place as a result of a call from the machine control system, as described hereinbefore.

For cleaning tool tapers or shanks, it is possible to house a tool taper cleaning station (TTC station) 38 in tool carrier 8. This makes it possible, when necessary, to clean the tool tapers passing into or coming out of the spindle. For economic reasons, tool taper cleaning in the TTC station must be performed in parallel with the master cycle. It must therefore be integrated into the normal tool change sequence, but without having to be performed on each occasion.

As can be gathered from FIG. 7a, appropriately the TTC station 38 is installed on the tool carrier path with the largest diameter at a tool storage location. In most cases, the tool changer 14 is in the change waiting position and waits for the actual tool change instruction from the control system. This favorable position is only used for tool taper cleaning of the requested tool. As the TTC station 38 has already been brought in time-parallel manner with the preceding swivel arm movement to the change waiting position, station 38 is precisely behind the tool taper of the tool waiting in the swivel gripper. By the lifting movement of the linear motor 34 the tool taper is inserted into the cleaning station 38, without having to move into a special cleaning position for tool changing purposes. In view of this time-saving cleaning possibility, the taper or shank cleaning can be determined and planned into the tool change sequence and only has to be skipped in the case of particularly short tool change sequences.

The reorganization of the tools in the store device, as is in practice necessary, can be performed in a rapid and universal manner. If tool magazines with several tool locations have to be changed, use is made of a handling device, which utilizes the acceptance mandrel 12. The advance unit 25 advances the magazine to be replaced and can be taken over by a handling device. A magazine is also reinserted by means of the handling device and advance unit 25.

Figure 8:
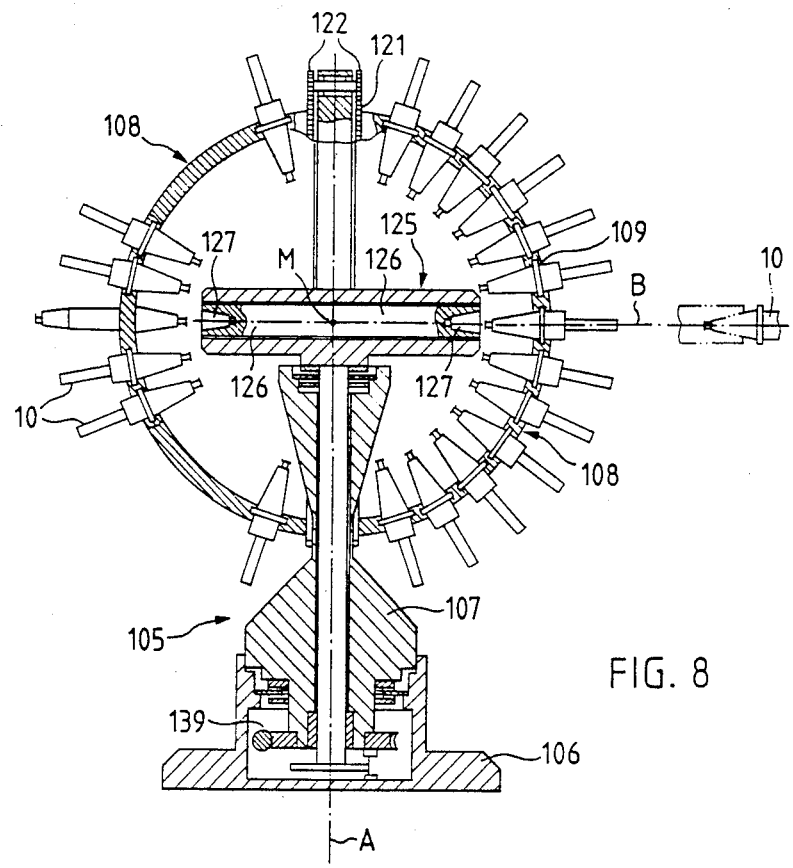
FIG. 8 is a diagrammatic elevation sectional view of the tool store device for a machine tool in accordance with another embodiment.

FIG. 8 shows a modified tool store device S which, unlike that of FIGS. 1 and 2, is equipped with a stand 105 with tool carriers 108 constructed as spherical segments and arranged on either side. The tool carriers 108 have the same construction as tool carrier 8 in the tool store device according to FIGS. 1 and 2. The radial arrangement of tools 10 is also the same as in tool carrier 8. The tool carriers 108 are rotatably arranged in the same manner as tool carrier 8 with pinions 122 on a support frame 107 of stand 105. Stand 105 is rotatable in base 106 about vertical axis A, a drive being located in base 106 for support frame 107.

An advance unit 125 is mounted in the interior of the two tool carriers 108 and can be swivelled about the vertical axis A. Unlike advance unit 25, advance unit 125 has two displacement units 126 with in each case one gripper 127. The displacement units 126 move in the plane of the horizontal axis B.

Figure 9:
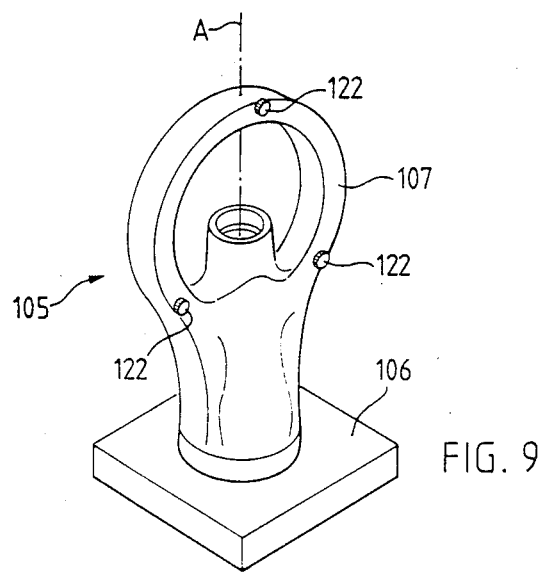
FIG. 9 is a diagrammatic view of a column of the store device according to FIG. 8.

FIG. 9 shows the stand 105 alone. The support frame 107 is constructed as a narrow ring and has on either side the pinions 122 for mounting the tool carrier 108.

Store device S according to FIG. 8 is constructed in the same way as the store device S according to FIGS. 1 and 2, and carries the tool carriers 108 and all the other components. The tool changer 114, cf. FIG. 10, can also be fixed to base 106. This makes available a precisely adjustable and autonomous tool supply unit (tool store device and tool changer), which can be adapted to different known machine tools and machining centers.

The two tool carriers 108 are each constructed in the same way as that of FIGS. 1 and 2, reference being made to FIG. 3 and the relevant description. Obviously the tool store device S can be operated with only a single tool carrier and then there are less tool locations 109.

The linear advance of the tools 10 takes place in the same way as in the case of the store device according to FIGS. 1 and 2 by the advance unit 125. In connection with the construction of the latter, reference is made to the description of advance unit 25 and the tool store device of the present applicant described in the second-mentioned industrial property right publication. Here again, the advance unit 125 can be coupled to a tool 10 without advancing it and the advance unit can be uncoupled and rotated together with the stand 105 about vertical axis A. For the transfer of tools to the tool changer 114, the advance unit 125 is, however, rigidly positioned and only the spherical segment performs its movements around the same. Thus, any individual tool in any tool-receiving location 109 can be advanced to the tool changer 114. FIG. 8 shows such an advanced tool 10 at the far right.

Figure 10:
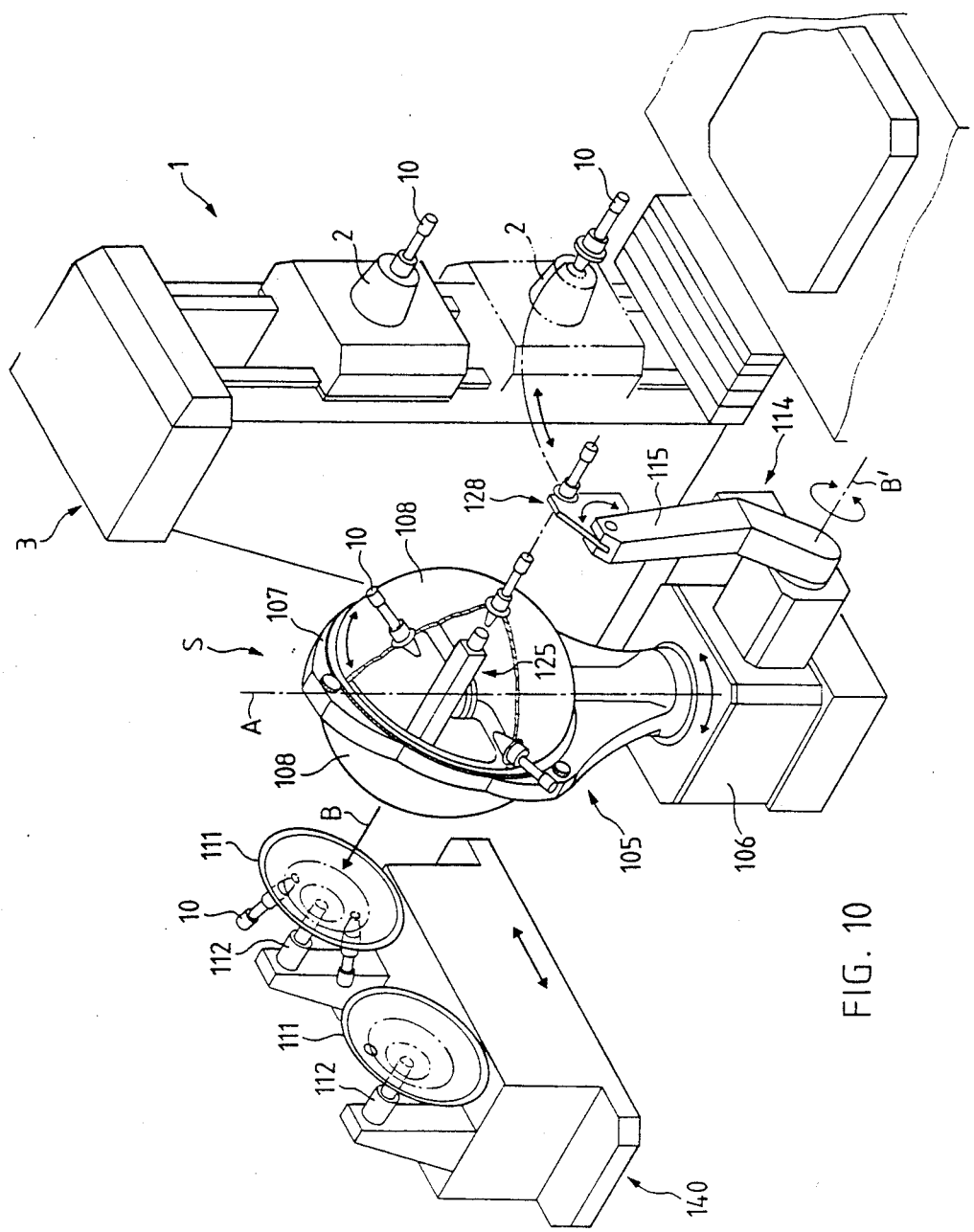
FIG. 10 is a perspective view illustrating the arrangement of the tool store device according to FIG. 8 on a machine tool.

To permit the groupwise replacement of tools as well as individual tools, as in the case of the tool store device according to FIGS. 1 and 2, tool magazines 111 are used, cf. FIG. 10. The tool magazines 111 are moved up to and positioned on a conveying or transporting means 140, e.g. a trolley or forklift truck, so that the tool magazine 111 can be taken from the advance unit and inserted in tool carrier 108.

Figure 11:
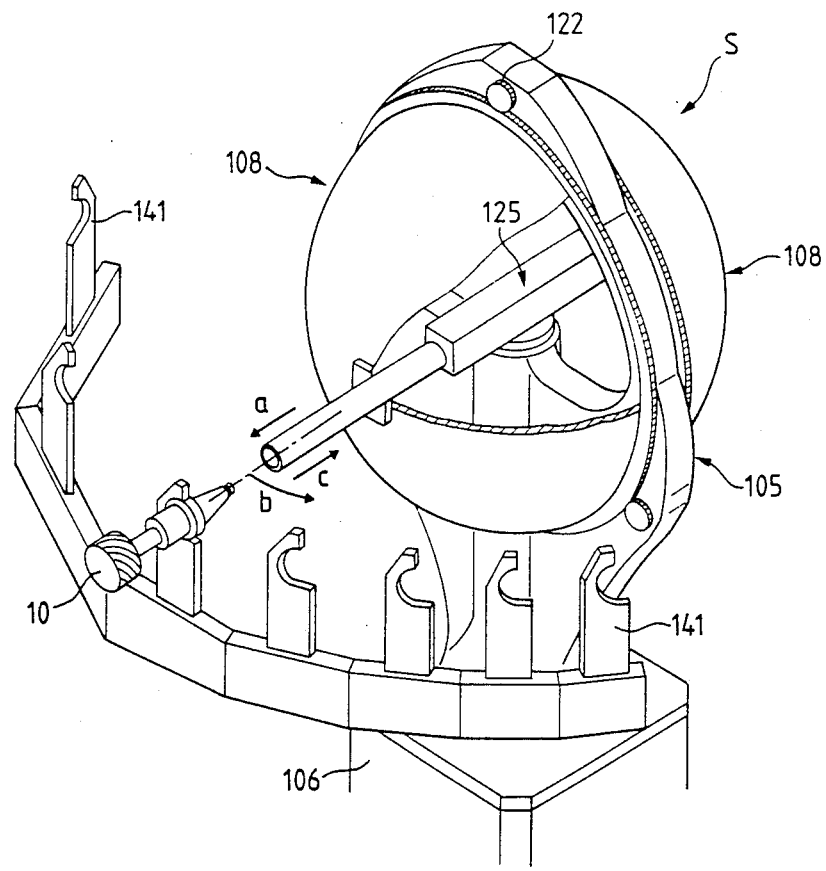
FIG. 11 is a perspective view of the tool store device according to FIG. 8 with individual tool locations arranged around it.

In accordance with FIG. 11, for the replacement of individual tools, members 141 fixed about the vertical axis A can be provided for the individual tool locations. For replacement purposes, the operator can place certain tools in the members, without intervening in the movement sequence of tool store S. The control system selects the appropriate point for loading or unloading the individual tools. For this purpose the advance unit 125 is moved into the corresponding position. The tool is gripped and received in the store in accordance with arrows a, b and c. The unloading of an individual tool takes place in the reverse order.

Tool taper or shank cleaning can also take place on the tool carrier 108, as described relative to FIG. 7.

Like the tool store device S of FIGS. 1 and 2, store device S according to FIG. 8 can be used as a direct store. Here again, the main advance of this store device is that the tool is made very rapidly available and the large tool storage density is ensured. FIG. 10 shows the use of tool store device S as a direct store. For this purpose, the tool changer 114 is located in base 106 and its swivel arm 115 carries a tool double gripper 128. The replacement of a tool from tool spindle 2 of machine tool 1 takes place in the manner described in connection with FIGS. 1 and 2.

This is illustrated by the following example. The tool carrier 8 with a maximum spherical shell diameter of 1.3 m can receive up to 200 tools with the tool taper 50. In the case of tools with the tool taper 30, up to 300 tools can be stored in tool carrier 8. Despite the dense, uninterrupted arrangement of the radially arranged tools favorable geometrical space conditions result from the double curvature of the spherical cup permitting the reception of large tools without losing adjacent tool storage locations. The transportation of a spherical cup filled with tools can also take place relatively easily.

Therefore the described store has important advantages compared with a cylindrical store. In addition, it combines a large storage volume with the possibility of direct access from tool carrier 8 to work spindle 2 and back therefrom.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tool store device for machine tools, particularly for programmable machine tools, for storing, removing, returning and making available tools which are arranged individually and in groups with longitudinal axes thereof extending at right angles to a store surface, the device comprising a tool carrier carrying the tools; an advance unit for gripping the tools at said tool carrier; a tool changer for removing the tools from and returning the tools to said tool carrier; a stand in which is mounted said tool carrier, said tool carrier being formed as a substantially spherical segmental shell provided with tool-receiving locations and being driven by a motor mounted in said stand to rotate about a horizontal axis intersecting a center (M) of said spherical segmental shell, said advance unit being arranged in an interior of the spherical segmental shell.

2. The tool store device according to claim 1, wherein two tool carriers receiving the tools are provided, which are rotatably mounted on said stand and each being formed as a spherical segmental shell provided on either side of the stand, said tool carriers being rotatable about a horizontal axis.

3. The tool store device according to claim 1, wherein said stand includes a support frame and a base, said tool carrier being rotatably mounted on said support frame.

4. The tool store device according to claim 1, further comprising means for swivelling said advance unit about a vertical axis intersecting the center (M) of the spherical segmental shell.

5. The tool store device according to claim 1, wherein said advance unit comprises at least one displacement unit provided with a tool gripper.

6. The tool store device according to claim 1, wherein said advance unit is mounted on a swivel shaft arranged coaxially to a vertical axis and driven by a swivel drive, said swivel shaft including a clutch for coupling thereto and uncoupling therefrom said advance unit.

7. The tool store device according to claim 2, further comprising means for swivelling said advance unit about a vertical axis intersecting the center (M) of the spherical segmental shell.

8. The tool store device according to claim 2, wherein said advance unit comprises two oppositely directed displacement arms each provided with a tool gripper.

9. The tool store device according to claim 2, wherein said advance unit is mounted on a swivel shaft arranged coaxially to a vertical axis and driven by a swivel drive, said swivel shaft including a clutch for coupling thereto and uncoupling therefrom said advance unit.

10. The tool store device according to claim 5, wherein said displacement unit is a linear motor.

11. The tool store device according to claim 8, wherein each displacement arm is formed as a linear motor.

12. The tool store device according to claim 1, wherein said tool carrier is comprised of a plurality of individual polygonal tool carrier elements provided with tool-receiving locations and assembled to form said spherical segmental shell.

13. The tool store device according to claim 12, wherein said individual tool carrier elements are of rectangular configuration.

14. The tool store device according to claim 12, wherein said individual carrier elements are of hexagonal configuration.

15. The tool store device according to claim 1, wherein said tool carrier is provided on a side of said stand with a toothed rim which is centered with and is rotatable in pinions rotatably mounted on said stand.

16. The tool store device according to claim 2, wherein each tool carrier is provided on a side of said stand with a toothed rim which is centered with and is rotatable relative to pinions rotatably mounted on said stand.

17. The tool store device according to claim 12, wherein a number of said tool carrier elements are assembled to form a spherical segmental tool magazine suitable for transfer to said tool carrier and which is provided with a radially arranged acceptance mandrel with which it is possible to handle and transfer the tool magazine to and return the magazine from said advance unit.

18. The tool store device according to claim 1, wherein said tool changer is operatively connected to said tool carrier and is mounted on said stand, said tool changer including a swivel arm and a tool double gripper mounted on an end of said swivel arm.

19. The tool store device according to claim 18, wherein said swivel arm of said tool changer is swivellable in such a way that the tool double gripper permits both the tool transfer and tool acceptance at transfer stations from said advance unit to said tool double gripper and back therefrom and from a machine spindle to said tool double gripper and back therefrom in a reverse order.

20. The tool store device according to claim 18, wherein said tool changer is swivellable about a vertical axis.

21. The tool store device according to claim 18, wherein said tool changer is swivellable about a horizontal axis at a base of said stand.

22. The tool store device according to claim 1, wherein said stand includes a support frame which has a wedge-shaped cross-section whereby an axis of rotation of said tool carrier which forms the horizontal axis forms with an axis of a machine spindle an angle smaller than 90°.

23. The tool store device according to claim 1, wherein said tool carrier contains a tool location for fixing therein a tool taper cleaning station which can be handled by a tool double gripper of said tool changer in such a way that the tools during a waiting time of said tool changer can be introduced by said tool changer into said cleaning station and then removed therefrom.

24. The tool store device according to claim 1, wherein holders for receiving individual tools are provided, which are centrally arranged with respect to the center (M) about said tool carrier, said holders being taken over or occupied by said advance unit.

25. The tool store device according to claim 23, wherein said cleaning station is provided with a cleaning rotor.

* * * * *